Jan. 20, 1970   N. LUTGEN   3,490,755
HIGH-TEMPERATURE DEVICE FOR THE INJECTION OF FLUIDS
Filed June 12, 1967   2 Sheets-Sheet 2

INVENTOR
NOËL LUTGEN
BY Young & Thompson
ATTYS

# United States Patent Office 3,490,755
Patented Jan. 20, 1970

3,490,755
HIGH-TEMPERATURE DEVICE FOR THE INJECTION OF FLUIDS
Noel Lutgen, Sucy-en-Brie, France, assignor to L'Air Liquide, Societe Anonyme pour l'Etude et l'Exploitation des Procedes Georges Claude
Filed June 12, 1967, Ser. No. 645,144
Claims priority, application France, June 27, 1966, 67,101
Int. Cl. C21c 7/00
U.S. Cl. 266—34
2 Claims

ABSTRACT OF THE DISCLOSURE

A device for injecting gas into molten metal, comprising an injection duct and a fluid-permeable member (12) surrounding the injection duct, wherein the injection duct is constituted by a porous, permeable refractory block (4) which is rendered fluid-tight laterally by a metal jacket (8). The jacket may be formed by spraying metal on the lateral surface of the injection duct.

---

The present invention relates to high-temperature devices such as injectors, tuyeres and burners for metallurgical furnaces.

In the specification of U.S. Patent No. 3,330,645, there is described a high-temperature device of the class comprising injectors, tuyeres and submerged burners, said device, when in use, being in contact with a high-temperature medium such as hot molten metal, more particularly with molten ferrous metal, and being provided with at least one injection duct for injecting a first fluid into said molten metal, a fluid-permeable refractory member surrounding said duct and means for supplying a second fluid through said member into said molten metal. Such a high-temperature device will hereinafter be referred to as the "high temperature device as defined."

According to the present invention there is provided a high-temperature device as defined, wherein the or each injection duct is constituted by a porous, permeable, refractory block which is rendered fluid-tight laterally by a metallic jacket.

It would also be possible, instead of a porous block, to use a group of capillary tubes. This solution would have considerable disadvantages: the capillary tubes are difficult to produce and to fix to one another; they also produce relatively large bubbles and they become blocked when their ends are put in contact with molten metal before blowing gas through them. On the other hand, porous refractory blocks which are relatively easy to produce have been manufactured industrially for a long time, and produce very fine bubbles and do not become blocked with molten metal.

The present invention makes it possible to produce in a relatively simple manner the assembly of the injection duct and the porous material arranged about it, with a good sealing-tightness between these two parts.

The injectors according to the invention can be used in many different ways.

For example, it is possible to pass different fluids through the injection duct and the material separated therefrom by the jacket, when it is desired to make such fluids act simultaneously but separately on the aforesaid medium.

Two embodiments of the present invention will now be described by way of example with reference to the accompanying drawings, in which.

Figure 1:
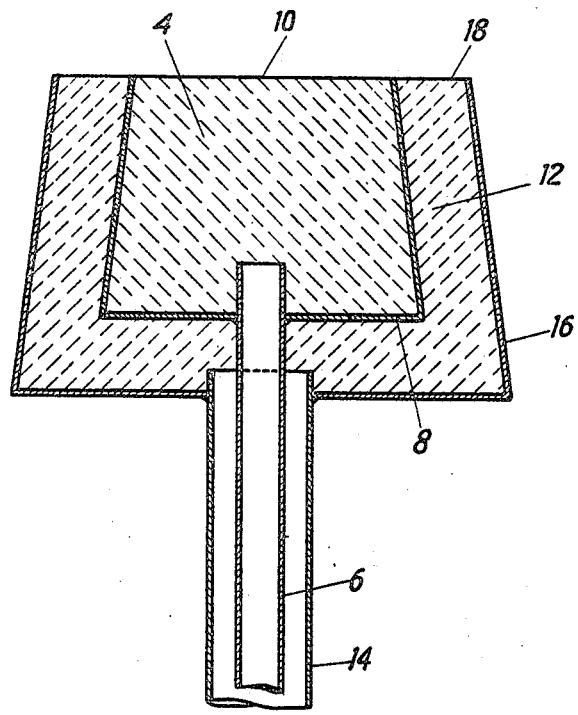
FIGURE 1 is a view in section taken through the axis of a first embodiment.

Referring now to the drawings, FIGURE 1 shows an injector for the passage of two gases which become mixed only when they issue from the injector. In this figure, a central block 4 which is refractory, porous and permeable, is supplied with one of the gases through a pipe 6 which extends for a short distance into the said block. A metallic coating forming a jacket 8 makes the block gas-tight below and at the sides, but does not extend over the upper face 10 which will be in contact with said high-temperature medium.

Except at the face 10, the block 4 is surrounded by another block 12 which also is refractory, porous and permeable. The block 12 is supplied with gas through a pipe 14 which is concentric with the pipe 6 to facilitate production but which could equally well be arranged at a certain distance from said pipe 6. It would also be possible to supply the block 12 through a plurality of pipes. The block 12 is also provided with a metallic coating forming a jacket 16 except at the upper face 18.

To produce this assembly, first of all the block 4 sealed to its pipe is produced in a mould, said block being made for example of alumina, magnesia, chromite, or calcium carbonate-containing cement. After removal from the mould, the block 4 is coated with metal by spraying with a gun, more particularly at the connection with the pipe, but avoiding the upper face 10.

The assembly 4, 6 and the pipe 14 are then suitably arranged in a mould, and a refractory composition such as one of those mentioned in connection with the block 4 is then packed about the jacket 8 within the mould. After hardening of said refractory composition and removal from the mould, the block 12 is metallized in the same way as the block 4. This metal coating can be produced by spraying-on with a gun copper, iron, nickel, or Nichrome, depending on the fluid which is to be blown-in. The same applies to the metal coating forming the jacket 8.

The assembly 4, 6, 12, 14 is then installed at the place of use or stored in readiness.

Figure 2:
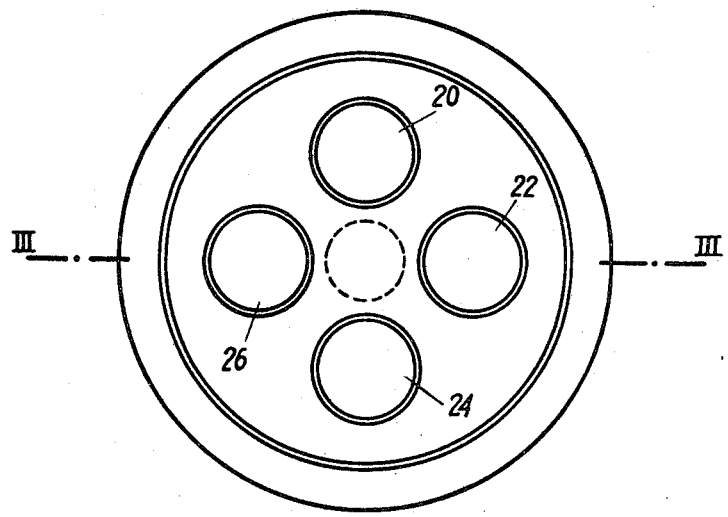
FIGURE 2 is a plan view of a second embodiment.
Figure 3:
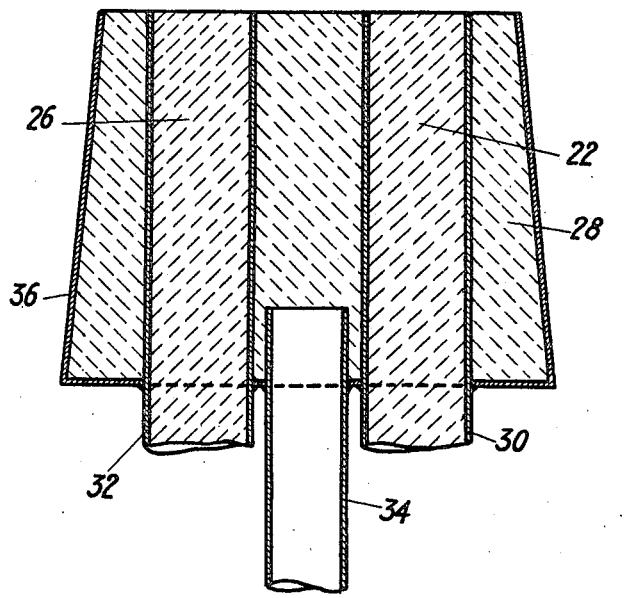
FIGURE 3 is a sectional view on the line III—III of FIGURE 2.

The injector illustrated in FIGURES 2 and 3 comprises four injection ducts, 20, 22, 24 and 26, all made of refractory, porous, permeable materials.

The ducts 20, 22, 24, 26 are made for example from calcium carbonate-containing cement, moulded in the ends of pipes, two of which are shown at 30, 32. These pipe ends constitute the metal jackets preventing lateral diffusion of gas from the ducts towards the surrounding mass 28.

These ducts, with their pipes, and a pipe 34 for supply towards the mass 28, are suitably arranged in a mould. Then for example calcium carbonate cement is packed into the mould about the ducts. After setting and hardening, the assembly is removed from the mould and then coated with metal to form a jacket 36.

The injectors illustrated can be modified without departing from the scope of the present invention as defined in the accompanying claims. For example, production of a metal coating by spraying can be replaced by heating a sheet metal jacket to a bright red heat and fitting it over the refractory material constituting an injection duct. Suitable positioning means make it possible to dispense with providing a jacket on the lower end face of the injection duct. Furthermore, it is also possible in some cases not to provide a jacket on the block which surrounds the ducts.

It is possible to inject vapours through the various porous, refractory elements. These vapours may be, for example, vapours of substances which are brought into contact in the solid or liquid state with the entry face of the injector.

A high-temperature device of the invention can be used in many different ways. For example, it is possible to pass different fluids through the injection duct and the material separated therefrom by the jacket. This particular use is advantageous when it is desired to make such fluids act simultaneously but separately on the aforesaid medium.

The above-described devices may not only be used as injectors but also, for example, as burners and the high-temperature medium with which, in operation, they are in contact may for example be molten metal, or metal which is to be melted, contained in a crucible or in a ladle in a furnace or boiler, or molten metal flowing through a channel.

I claim:
1. A high-temperature device for the injection of fluids, comprising an injection duct constituted by a porous, fluid-permeable body of refractory material exposed or one side, means to supply fluid to said body at a region spaced from said side, a metal jacket laterally encompassing the body in fluid-tight relation, and a further fluid-permeable body of refractory material laterally encompassing said metal jacket, there being a plurality of said injection ducts spaced apart from each other within said further body of refractory material.

2. A high-temperature device for the injection of fluids, comprising an injection duct constituted by a porous, fluid-permeable body of refractory material exposed on one side, means to supply fluid to said body at a region spaced from said side, a metal jacket laterally encompassing the body in fluid-tight relation, a further fluid-permeable body of refractory material laterally encompassing said metal jacket, and means separate from said fluid supply means for supplying fluid to said further body of refractory material.

References Cited

UNITED STATES PATENTS 2,811,346  10/1957  Spire.
3,330,645  7/1967  De Moustier et al.

J. SPENCER OVERHOLSER, Primary Examiner

J. S. BROWN, Assistant Examiner

U.S. Cl. X.R.

222—195